Feb. 27, 1923.
W. E. CASTLEBURY
MILKING PAIL
Original Filed Mar. 18, 1922
1,446,692
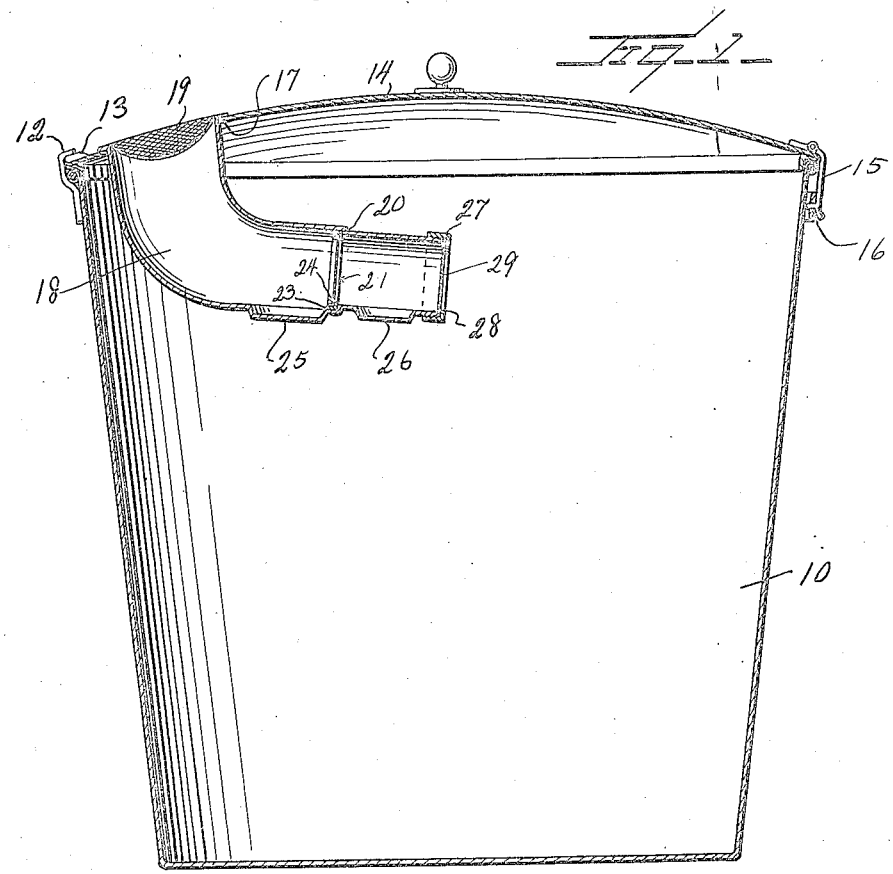
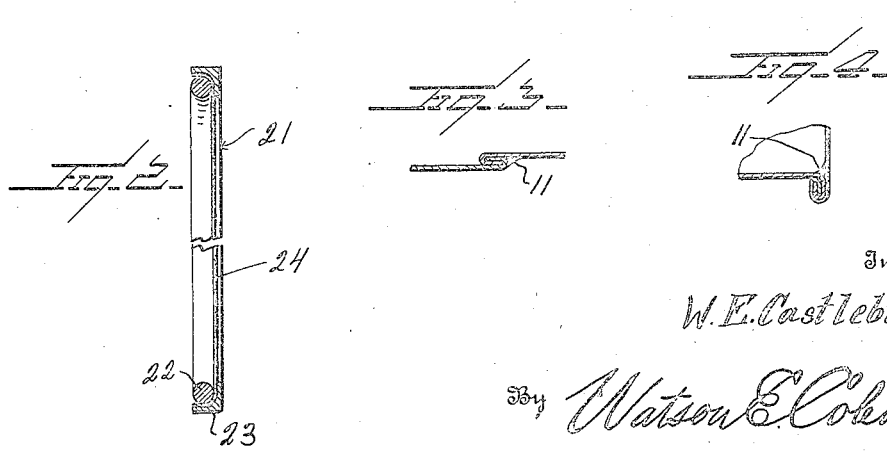
Inventor
W. E. Castlebury
By Watson E. Coleman
Attorney Patented Feb. 27, 1923.

1,446,692

UNITED STATES PATENT OFFICE.

WALTER E. CASTLEBURY, OF DALLAS, TEXAS.

MILKING PAIL.

Application filed March 18, 1922, Serial No. 544,882. Renewed January 4, 1923.

*To all whom it may concern:*

Be it known that I, WALTER E. CASTLE-BURY, a citizen of the United States, residing at Dallas, in the county of Dallas and State of Texas, have invented certain new and useful Improvements in Milking Pails, of which the following is a specification, reference being had to the accompanying drawings.

This invention relates to improvements in milking pails and more particularly to a combined milking pail and strainer.

An important object of the invention is to provide in a device of this character a construction whereby the strainer is readily removable for cleansing.

A still further object of the invention is to provide a strainer, parts of which are readily removable for cleansing or replacement and which is provided with strainer means for receiving the heavier particles entering the strainer with the milk.

These and other objects and advantages I attain by the construction and arrangement shown in the accompanying drawings wherein for the purpose of illustration is shown a preferred embodiment of my invention and wherein like reference characters designate like parts throughout.

In the drawings:—

Figure 1 is a sectional view taken through a milk pail constructed in accordance with my invention;

Figure 2 is an enlarged detail sectional view taken through the removable strainer element; and Figures 3 and 4 are detail views showing the manner of filling the seams where the bucket is provided therewith.

Referring now more particularly to the drawings, the numeral 10 indicates a milk pail which is preferably of seamless construction or which has the seams thereof filled with solder, as indicated at 11 in Figures 3 and 4. The upper edge of the pail is provided with loops 12 adapted for the reception of lugs 13 formed upon a lid 14 and with a pivoted fastening member 15 adapted to engage in a slot 16 formed in the pail to secure the lid to the pail.

The lid 14 is provided with an opening 17 permitting the insertion therethrough of a strainer cone 18, the upper end of which is provided with a strainer 19 resting upon the lid at the side of the opening 17. The lower end of the cone is preferably arranged at an angle to the upper end thereof and has formed interiorly thereof a seat 20 for a removable strainer holder 21.

This strainer holder comprises inner and outer rings 22 and 23 adapted to receive therebetween the edges of a strainer element 24 to maintain the strainer element in stretched position, the outer ring 23 engaging against the seat when the strainer is inserted. At the side of the seat 20 next adjacent the entrance end of the funnel the lower portion of the funnel is formed with a depression or catch basin 25 in which the heavier particles of foreign matter contained in the milk may settle when the milk is checked in its flow by the strainer element 24. The seat 20 is formed in spaced relation to the discharge end of the strainer cone and this discharge end is provided with external screw threads adapted for engagement by a screw sleeve 27 having a shoulder 28 which is in-turned and which is adapted to coact with the end of the strainer cone to maintain in position a gauze strainer disk 29 preferably formed of open mesh nickel steel wire. Between the seat 20 and the discharge end of the cone the cone is provided in its lower face with a second catch basin 26 in which heavier particles may settle.

From the foregoing it will be obvious that the pail and strainer are so constructed as to avoid the formation of sharp corners therein which are difficult to clean and it will be obvious that the strainer elements of the cone may be readily removed for cleansing or replacement. It will furthermore be obvious that the catch basins 25 and 26 effectually prevent the lodging against the strainer element of the larger particles of foreign matter entering with the milk which would tend to clog the strainer and interfere with the proper operation thereof.

Many changes being possible in the shape, size and arrangement of the various parts hereinbefore disclosed without in any manner departing from the spirit of my invention, I do not limit myself to the specific structure thereof except as hereinafter claimed.

I claim:

1. The combination with a milk pail having a cover provided with an opening, of a strainer cone adapted to extend through the opening and provided upon the upper end thereof with shoulders adapted to engage the cover at the sides of the opening, the lower end of said strainer cone being arranged at an angle to the upper end thereof and being arranged at a slight angle to the horizontal, spaced strainer elements in said strainer cone adjacent the discharge end thereof, and catch basins formed in the lower surface of the interior of the cone in advance of each of said strainer elements.

2. In a strainer, a cone provided adjacent its discharge end thereof with a seat, a strainer holder engaged against said seat, and a catch basin formed in the lower wall of the cone in advance of said seat.

3. In a strainer, a cone provided adjacent its discharge end thereof with a seat, a strainer holder engaged against said seat, a catch basin formed in the lower wall of the cone in advance of said seat, said seat being spaced from the discharge end of the cone, a screw threaded sleeve engaging the end of the cone and provided with a flange opposing the end of the cone, a strainer element arranged between the end of the cone and the flange, and a catch basin formed in the bottom surface of the cone intermediate said seat and the last named strainer element.

In testimony whereof I hereunto affix my signature.

WALTER E. CASTLEBURY.